(12) United States Patent
Barnes

(10) Patent No.: US 10,653,253 B2
(45) Date of Patent: May 19, 2020

(54) WALL ARTICLE HANGING DEVICE AND METHOD OF USE

(71) Applicant: Renny H. Barnes, Warrenton, VA (US)

(72) Inventor: Renny H. Barnes, Warrenton, VA (US)

( * ) Notice: Subject to any disclaimer, the term of this patent is extended or adjusted under 35 U.S.C. 154(b) by 0 days.

(21) Appl. No.: 16/177,757

(22) Filed: Nov. 1, 2018

(65) Prior Publication Data

US 2019/0216240 A1 Jul. 18, 2019

Related U.S. Application Data

(60) Provisional application No. 62/616,560, filed on Jan. 12, 2018.

(51) Int. Cl.
*A47G 1/16* (2006.01)
*A47G 1/20* (2006.01)
*F16M 13/02* (2006.01)
*A47G 1/22* (2006.01)

(52) U.S. Cl.
CPC ............... *A47G 1/20* (2013.01); *A47G 1/162* (2013.01); *A47G 1/22* (2013.01); *F16M 13/02* (2013.01)

(58) Field of Classification Search
CPC .......... A47G 1/16; A47G 1/162; A47G 1/168
USPC ......... 248/684, 447.1, 459, 475.1, 489, 497, 248/498, 216.1, 217.1, 217.3, 217.4, 690, 248/692, 218.2, 218.3, 339
See application file for complete search history.

(56) References Cited

U.S. PATENT DOCUMENTS

| 165,206 | A | * | 7/1875 | Brown | A47G 1/16 248/489 |
|---|---|---|---|---|---|
| 236,865 | A | * | 1/1881 | Walker | A47G 1/16 248/489 |
| 1,914,951 | A | * | 6/1933 | Kiessling | A47G 1/162 248/498 |
| 1,945,897 | A | * | 2/1934 | Haukedahl | A47G 1/18 248/498 |
| 2,448,137 | A | * | 8/1948 | Cody | A47G 1/22 248/497 |
| 3,298,651 | A | * | 1/1967 | Passer | A47G 1/20 248/217.2 |
| 3,337,926 | A | * | 8/1967 | Daugherty | A47G 1/16 248/489 |
| 4,613,108 | A | * | 9/1986 | Sundstrom | A47G 1/20 248/216.1 |
| 5,236,168 | A | * | 8/1993 | Roy | A47G 1/162 248/498 |
| 5,267,718 | A | * | 12/1993 | Sheehan | A47G 1/22 248/217.3 |
| 5,328,139 | A | | 7/1994 | Barnes | |
| 5,588,629 | A | | 12/1996 | Barnes | |
| 5,758,858 | A | | 6/1998 | Barnes | |
| 6,095,478 | A | | 8/2000 | Barnes | |
| 6,830,228 | B2 | * | 12/2004 | Ernst | A47G 1/20 248/216.1 |
| 7,395,998 | B2 | * | 7/2008 | Peterson | A47G 1/20 248/218.2 |

(Continued)

*Primary Examiner* — Terrell L McKinnon
*Assistant Examiner* — Michael McDuffie
(74) *Attorney, Agent, or Firm* — Clark & Brody LP

(57) ABSTRACT

A wall article hanging device uses a plate having at least one prong, a bent configuration, and a keyhole opening to allow the wall article hanging device to be easily attached to from a wall article using a screw protruding from a back of the wall article and removed without having to remove the screw.

7 Claims, 3 Drawing Sheets

(56) References Cited

U.S. PATENT DOCUMENTS

| | | | |
|---|---|---|---|
| 7,497,028 B2* | 3/2009 | Nevers | A47G 1/1606 |
| | | | 33/613 |
| 8,740,171 B2* | 6/2014 | Crescenzo | A47G 1/16 |
| | | | 248/476 |
| 10,206,526 B1* | 2/2019 | Blakeslee | A47G 1/16 |
| 2004/0094685 A1* | 5/2004 | Janssen | A47G 1/20 |
| | | | 248/489 |
| 2007/0194202 A1* | 8/2007 | Lamotta | A47G 1/20 |
| | | | 248/475.1 |
| 2007/0205344 A1* | 9/2007 | Liermann | A01M 31/02 |
| | | | 248/217.3 |
| 2014/0231604 A1* | 8/2014 | Long | A47G 1/20 |
| | | | 248/217.3 |
| 2015/0308613 A1* | 10/2015 | Callif | F16M 13/02 |
| | | | 248/546 |

* cited by examiner

WALL ARTICLE HANGING DEVICE AND METHOD OF USE

This application claims priority under 35 USC 119(e) based on provisional application No. 62/616,560, filed on Jan. 12, 2018 and which is incorporated by reference herein in its entirety.

FIELD OF THE INVENTION

The present invention relates a wall article hanging device that first attaches to the wall article and then attaches to a wall structure. The wall article hanging device is easily removed from the wall article once the wall article is taken down from a wall structure.

BACKGROUND ART

Wall article hanging devices are well known in the art. These devices include conventional devices that are first attached to the wall and then an article like a picture is hung from the device.

Other devices like that disclosed in U.S. Pat. Nos. 5,328,139, 5,588,629, 5,758,858 and 6,095,478 to Barnes (all incorporated by reference in their entirety herein), are configured to first attach to the wall article to be hung using prongs on the device. With the device attached to the wall article, the wall article is hung on a wall. One drawback of these kinds of devices is that once the wall article is removed from the wall, the prongs of the wall article hanging device are exposed and these prongs can cause damage to other articles. As such, a need has developed for an improved article hanging device that still provides the ease of hanging provided in the Barnes patents but without leaving the prongs exposed once the article is removed from a wall.

SUMMARY OF THE INVENTION

One object of the invention is to provide an improved wall article hanging device.

Another object of the invention is to provide a method of hanging a wall article.

In satisfaction of the object, one embodiment of the invention is a wall article hanging device having a plate having first and second ends. The plate further includes a first portion of the plate having the first end and a keyhole opening adjacent the first end. The keyhole opening has a first opening and a second opening. The second opening is smaller than the first opening and is positioned between the first opening and the first end.

The plate also includes a bend, wherein the second portion of the plate is linked to the first portion by the bend, the second portion including the second end.

The first portion includes a prong extending from a surface of the first portion and towards the keyhole opening.

The second portion can also include an end flange as part of the second end.

The plate is preferably made of a spring steel, which aids in holding the plate in place when attached to a wall article for hanging purposes.

The invention also includes the use of the wall article hanging device to attach a wall article to a wall. The method of attaching a wall article hanging device to a wall article includes providing at least one wall article hanging device and a wall article having at least one screw attached to a back of the wall article, wherein the screw head of the screw protruding from the back of the wall article.

The wall article hanging device is positioned on the back of the wall article such that the screw head protrudes through the first opening of the wall article hanging device. The wall article hanging device is then moved along the back surface of the wall article such that a screw portion engages the second opening of the wall article hanging device.

The method can then further include attaching the wall article to a wall surface by pressing the prong of the wall article hanging device into the wall surface. A plurality of wall article hanging devices can be for attachment of the wall article hanging device to the wall article and subsequent attachment of the wall article to the wall.

DETAILED DESCRIPTION OF THE INVENTION

Figure 1:
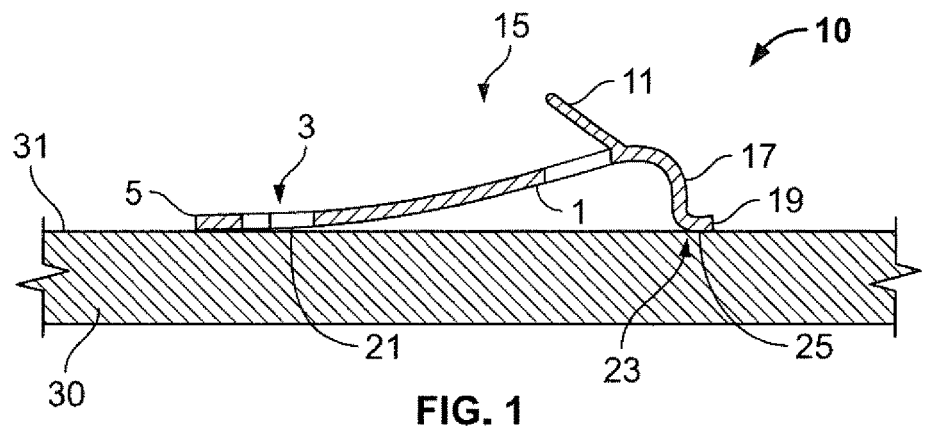
FIG. 1 shows one embodiment of the wall article hanging device in a side view attached to a wall article.
Figure 2:
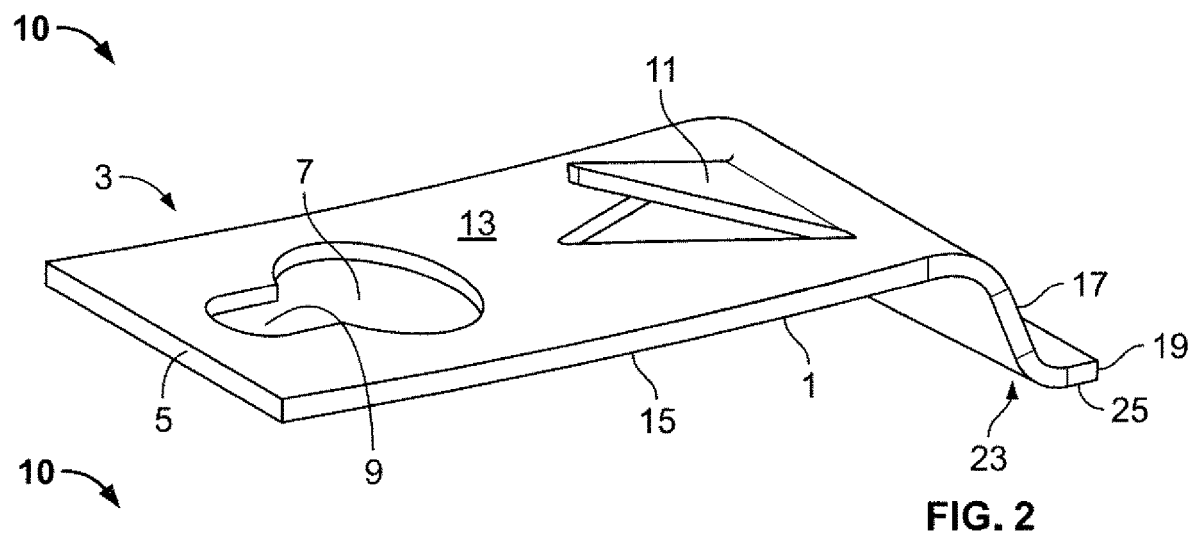
FIG. 2 shows a perspective view of the wall article hanging device of FIG. 1.
Figure 3:
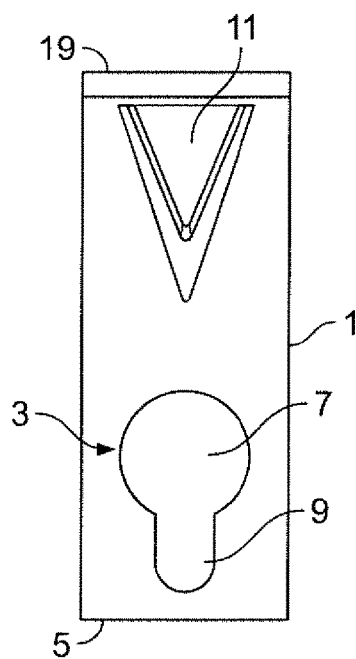
FIG. 3 shows a top view of the wall article hanging device of FIG. 1.

With reference to FIGS. 1-7, a wall article hanging device is designated by the reference numeral 10. The device 10 includes a plate 1 having a keyhole opening 3 near one end of the plate, which is designated by the reference numeral 5. The keyhole opening includes a first opening 7 that is sized to allow a screw head to pass through. The second opening 9 is sized smaller than the first opening to receive the screw portion of a screw.

The plate includes prong 11, which extends from face 13 of the plate. The plate has a first portion 15 that includes the prong 11 and the keyhole opening 3 and a second portion 17. The plate has a bend in it such that the second portion 17 is angled with respect to the first portion 15. The second portion 15 is angled with respect to the first portion such that plate, when resting on a wall article, angles upwardly from the end 5 to the prong 11 and then angles or bends downwardly to the end 19. The second portion 17 including the end 19 is designed to contact the back of the wall article being hung. With the second portion configuration, an underside 21 of the first portion is angled with respect to a surface 31 of the wall article 30 to be hung and the plate is generally I-shaped. As described below, the angulation created by the second portion bending with respect to the first portion assists in securing the wall article hanging device in place for wall article hanging. The presence of the bend also ensures that the prong 11 is fully seated into the structure that it is inserted in. Without the bend, the screw used with the wall article hanging device would interfere with full insertion of the prong.

The end 19 of the second portion 17 can just terminate like the other end 5. Optionally and as shown in FIGS. 1-7, the end 19 can have a flange 23 that forms an underside surface 25. The underside surface 25 provides a flat surface contact with the wall article being hung. Without the flange, the second portion would have edges like the end 5 and the edge of the end 19 could dig into the surface of the wall article, particularly if the wall article were made of a soft material.

Figure 4:
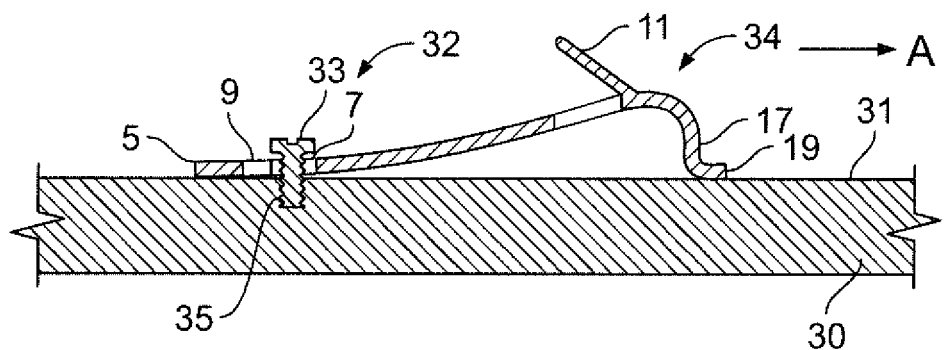
FIG. 4 shows the wall article hanging device of FIG. 1 in a first position for securing to a wall article.
Figure 5:
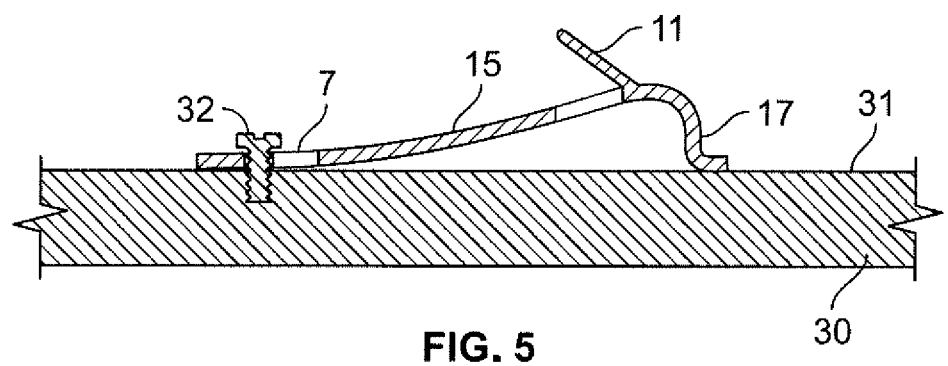
FIG. 5 shows the wall article hanging device of FIG. 4 is a secured position for securing a wall article.

In use and referring to FIGS. 4 and 5, the wall article 30 is shown with a screw 32 attached thereto. The device 10 is positioned on the surface 31 so that the screw head 33 passes through the larger first opening 7 and the end 19 of the second portion 17 and the end 5 of the plate 1 are in contact with the surface 31 of the wall article to be hung.

The screw 32 is positioned with a portion of the screw thread portion 35 exposed such that when device 10 is then moved in the direction A and the screw thread portion 35 of the screw 31 slides into the smaller second opening 9 of the keyhole opening 3. The movement of the device 10 to position the screw portion 35 in the second opening 9 along with the angulation of the device 10 created by the end portion 17 imparts a bias against the underside of the screw head 33 such that a tight fit occurs between an underside of the screw head 33 and surface 13 of the device 10. This bias assists in keeping the device 10 in place on the back of the wall article.

Depending on the size of the article, one, two or more than two devices 10 can be attached to the back of the wall article. The procedure above describing the attachment of the device to the wall article is merely repeated using another screw.

Figure 6:
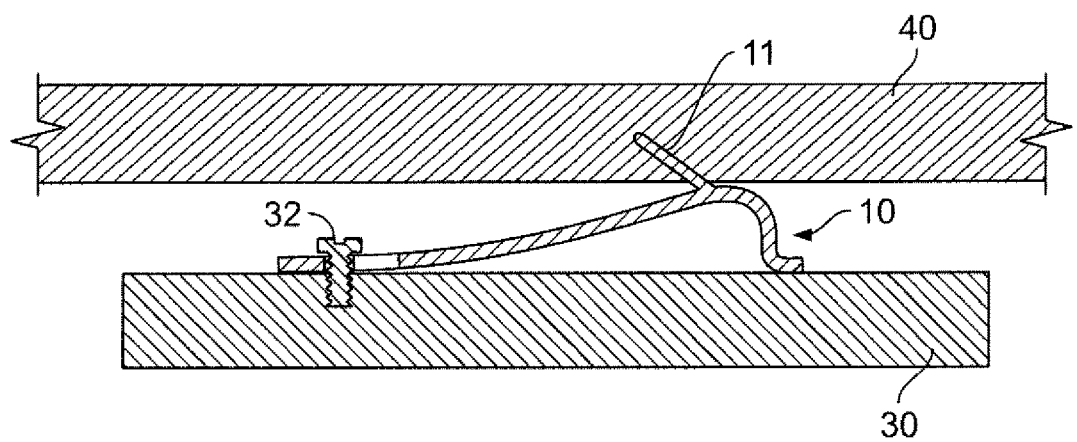
FIG. 6 shows the wall article hanging device of FIG. 1 in an exemplary wall article hanging use.
Figure 7:
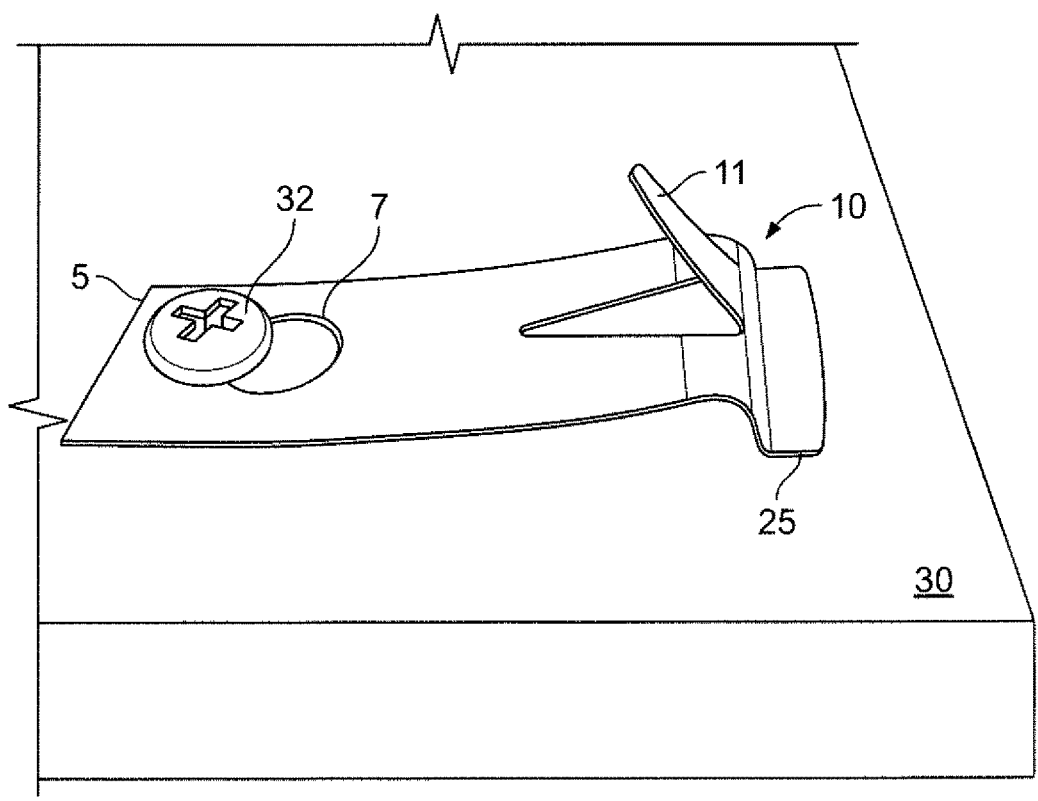
FIG. 7 shows a perspective view of the wall article hanging device in use.

In an example where only one device 10 is used, the article is then positioned against the wall where the wall article is to be hung. A force is applied against the wall such that the prong 11 extends into the surface of a wall, which results in a secure mounting of the wall article to the wall. This force application and prong insertion is like that described in the Barnes patents and a further explanation of attachment and removal is not necessary for understanding of the invention. FIG. 6 shows an exemplary attachment of the wall article 30 to a wall 40 using the device 10. The prong 11 is shown inserted into the wall 40. FIG. 7 shows the wall article hanging device in perspective view being attached to a wall article 30.

A significant advantage of the invention is that the wall article hanging device can be easily removed from the wall article. In the prior art wall article hanging devices, these devices were usually nailed in or screwed into the back of the wall article, thus making it tedious and time consuming to remove the wall article hanging devices. Because of this tediousness, the wall article hanging devices of the prior art were often left on a wall article after it was removed. This exposes the prong or prongs of the wall article hanging device, which then presented a danger in terms of damage to other articles if the wall article were stored and/or shipped, or harm to a person handling the wall article with the prongs exposed.

With the invention, one only has to move the wall article hanging device 10 in a direction opposite of direction A in FIG. 4. This positions the screw head 33 in line with the larger opening 7 of the keyhole opening 3 and the wall article hanging device 10 can be easily lifted off the surface 31 of the wall article and removed without removing the screw. Only the screw is left exposed on the back of the wall article and the screw can be left alone, tightened down, or removed, if desired. In another mode, the screw can be just removed from the wall article to remove the wall article hanging device. In another mode and as noted above, the wall article itself can be moved so that it can be separated from the screw. In this mode, the wall article hanging device can be pushed toward the back surface of the wall article. This acts against the bias created by the wall article against the screw head and allows the wall article hanging device to be moved so that the screw head is positioned in the larger opening in the plate and the wall article hanging device can be separated from the screw and wall article. In this mode, the bias of the device 10 holds the device on the screw and removing the bias by pushing down on the device allows the device 10 to move without having to loosen the screw. Similarly, the device can be positioned with the screw head in the larger opening 7 of the plate, then be pushed down against the back of the wall article against the bias of the device, and then be moved so that the screw thread portion 35 engages the smaller opening 9 and the underside of the screw head 33 engages the surface 13 of the device 10 when the device is no longer held down.

The device 10 can be made of any material. However, a material that has some resilience is preferred given the manner in which the wall article hanging device is attached and removed, e.g., a spring steel like 1050. While the plate thickness can vary, exemplary thickness range from 0.020 to 0.030 inches. A typical length for the device 10 is around 1 and ⅜ inches. However, the length and width of the device can vary depending on the size of the wall article to be hung. For heavier items such a mirrors, two prongs would be used per device for example.

While the wall article hanging device is shown with one prong, it could be sized in width so have two or more prongs. In a preferred mode, the prong 11 is formed by stamping and bending the prong from the plate itself, although a separate prong could be attached to the plate by welding or the like.

As such, an invention has been disclosed in terms of preferred embodiments thereof which fulfills each and every one of the objects of the present invention as set forth above and provides a new and improved wall article hanging device and method of use.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A wall article hanging device comprising
a plate having first and second ends and a front surface and a back surface, the plate further comprising:
a first portion of the plate having the first end and a keyhole opening adjacent the first end, the keyhole opening having a first opening and a second opening, the second opening smaller than the first opening and positioned between the first opening and the first end
a bend,
a second portion of the plate linked to the first portion by the bend and having the second end,
the first portion including a prong extending from the front surface of the first portion of the plate and towards the keyhole opening and positioned on the plate between the bend and the keyhole opening;
wherein the back surfaces of the plate at the first end and the second end are generally co-planar for facing a surface of the wall article to be hung using the wall article hanging device.

2. The wall article hanging device of claim 1, wherein the second portion has an end flange.

3. The wall article hanging device of claim 1, wherein the plate is made of spring steel that provides a bias against a screw head positioned over the second opening when the wall article hanging device is installed on a wall article.

4. A method of attaching a wall article hanging device to a wall article comprising:
   providing at least one wall article hanging device, the wall article hanging device comprising:
   a plate having first and second ends, the plate further comprising:
   a first portion of the plate having the first end and a keyhole opening adjacent the first end, the keyhole opening having a first opening and a second opening, the second opening smaller than the first opening and positioned between the first opening and the first end
   a bend,
   a second portion of the plate linked to the first portion by the bend and having the second end,
   the first portion including a prong extending from a surface of the first portion and towards the keyhole opening;
   providing a wall article having at least one screw attached to a back of the wall article, a screw head of the screw protruding from the back,
   positioning the wall article hanging device on the back such that the screw head protrudes through the first opening of the wall article hanging device,
   moving the wall article hanging device along the back such that a screw thread portion engages the second opening of the wall article hanging device.

5. The method of claim 4, further comprising:
   attaching the wall article to a wall surface by pressing the prong of the wall article hanging device into the wall.

6. The method of claim 4, wherein a plurality of wall article hanging devices are provided for attachment of the wall article hanging device to the wall article and subsequent attachment of the wall article to the wall.

7. The method of claim 5, wherein a plurality of wall article hanging devices are provided for attachment of the wall article hanging device to the wall article and subsequent attachment of the wall article to the wall.

* * * * *